US009664889B2

(12) United States Patent
Krajewska

(10) Patent No.: US 9,664,889 B2
(45) Date of Patent: May 30, 2017

(54) RETRACTABLE MAGNIFYING GLASS ACCESSORY TO A WATCH BAND

(71) Applicant: Grazyna Krajewska, San Diego, CA (US)

(72) Inventor: Grazyna Krajewska, San Diego, CA (US)

( * ) Notice: Subject to any disclaimer, the term of this patent is extended or adjusted under 35 U.S.C. 154(b) by 0 days.

(21) Appl. No.: 14/214,501

(22) Filed: Mar. 14, 2014

(65) Prior Publication Data
US 2015/0002947 A1   Jan. 1, 2015

Related U.S. Application Data

(60) Provisional application No. 61/801,700, filed on Mar. 15, 2013.

(51) Int. Cl.
  *G02B 25/00* (2006.01)
  *G02B 27/04* (2006.01)

(52) U.S. Cl.
  CPC ........... *G02B 25/002* (2013.01); *G02B 27/04* (2013.01)

(58) Field of Classification Search
  CPC .......................... G02B 25/002; G02B 25/005
  USPC ................... 351/56, 155, 158; 359/802, 803
  See application file for complete search history.

(56) References Cited

U.S. PATENT DOCUMENTS

| | | | | |
|---|---|---|---|---|
| 5,601,222 A * | 2/1997 | Haddad | ................ | A44C 5/0007 224/165 |
| 6,275,333 B1 * | 8/2001 | Shaffer | ................ | G02B 25/002 359/440 |
| 6,480,441 B1 * | 11/2002 | McKay | ................ | G02B 25/002 359/809 |
| 6,614,604 B1 * | 9/2003 | Budde | ................ | G02B 25/002 359/817 |
| 7,471,467 B1 * | 12/2008 | Kalwa | ................ | G02B 25/002 359/802 |
| 2007/0187440 A1 * | 8/2007 | Rosenbaum et al. | ......... | 223/111 |
| 2008/0094735 A1 * | 4/2008 | Chelberg | .............. | H04M 1/027 359/802 |
| 2008/0168674 A1 * | 7/2008 | Nielson | .................... | G01B 3/10 33/765 |
| 2009/0213477 A1 * | 8/2009 | Kisko | ................ | G02B 25/002 359/807 |
| 2010/0073626 A1 * | 3/2010 | Engstrom | ............. | A45C 11/04 351/63 |

(Continued)

FOREIGN PATENT DOCUMENTS

WO   WO2013150531 A1 * 10/2013 ............... G01B 3/02

*Primary Examiner* — Scott J Sugarman
*Assistant Examiner* — Gary O'Neill
(74) *Attorney, Agent, or Firm* — David B. Waller

(57) ABSTRACT

The present invention is a retractable magnifying glass having a magnifying glass with an aperture on one end, housing, spring positioned parallel to the magnifying glass within the housing and retractable cord. The housing has front and back sides and a first and second compartment. The back side has a strap connector for affixing to a strap. The first and second compartments are adjacent and parallel to each other and connected via a cord aperture. The second compartment has an open side to allow ingress and egress of the magnifying glass and a portion of the magnifying glass extends beyond this open side for easy access. The retractable cord is affixed within the first compartment with one end connected to the spring and the other extending through the cord aperture and connected to the aperture of the magnifying glass.

2 Claims, 2 Drawing Sheets

(56) References Cited

U.S. PATENT DOCUMENTS

2011/0080660 A1* 4/2011 Kerle .................. B62B 3/14
                                                    359/809

* cited by examiner

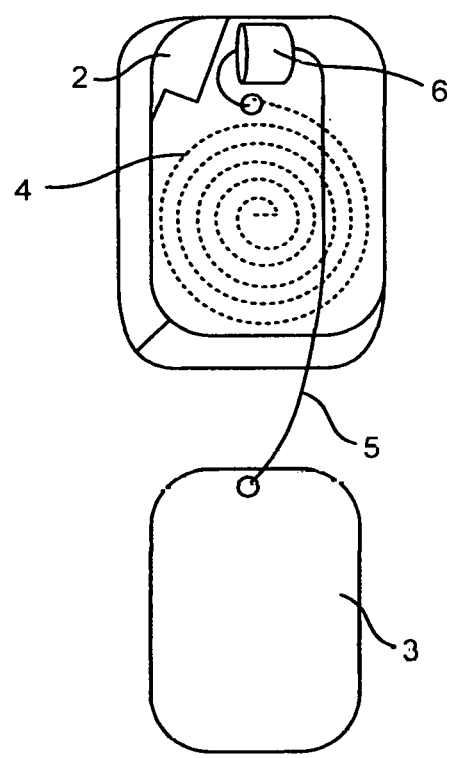
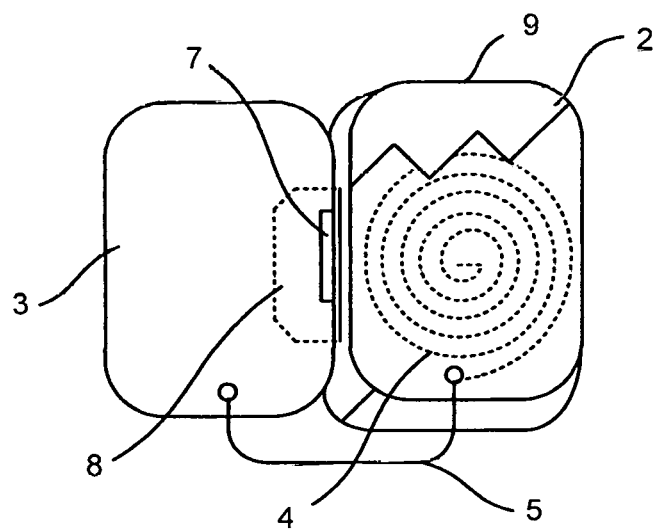
FIG. 3
FIG. 4

RETRACTABLE MAGNIFYING GLASS ACCESSORY TO A WATCH BAND

BACKGROUND OF THE INVENTION

1. Field of the Invention

This invention relates to the field of portable optical magnification. More specifically the invention comprises the retractable magnifying glass device to be removably added to an existing watch band, bracelet, belt, purse strap, or any other strap.

2. Problem to be Solved and the Related Art

With age people become farsighted. They need glasses to see close objects. Bifocal glasses are one of the solutions to this problem, however some people do not like to wear glasses. When they are in the store they can see clearly the things they want to buy, however they cannot read the price, or other details. Present invention aims to solve this problem by enabling them to just pull out the magnifying glass from its mounting on the watch, belt, or purse strap, stretch it out to the object they want to read the text on, and let it retract back after they are done. It is a much easier and less time consuming process than having to put glasses on and take them off again and again, or search for a magnifying glass in a pocket or purse and remember to put it back.

There are retractable measuring tapes, and retractably mounted objects. For magnification there are several designs of portable magnifying glasses and optical glasses. The prior art U.S. Pat. No. 7,667,903B2, Retractably mounted magnifying glass assembly by Mary Kisko is meant to be connected to a flat surface with a stationary frame. The prior art U.S. Pat. No. 5,113,289, Shelf-mounted magnifying glass by Sara Soper, and U.S. Pat. No. 6,441,974 B1 Shopping cart magnifier (E-Z reader), by Thomas A. Miranda, Jonathan C. Roche, Randolph G. Duso have to be implemented by a store owner rather than a customer.

There are also existing patents on a magnifying glass incorporated as a part of a watch case or watch band: U.S. Pat. No. 2,679,785 A, Wrist watch by Hugo Batt, where a magnifying glass is a part of a watch case; U.S. Pat. No. 8,125,853 B2, Watch bracelet by Robert Greubel, Stephen Forsey has a magnifying glass as part of the bracelet; and U.S. Pat. No. 5,601,222, A Magnifying wristband by Richard Y. Haddad, has a magnifying glass permanently built into a watch band.

The present invention differs from previous patents. Rather than being connected to the surface of the stationary object it is designed with the size, positioning of its elements, and connector design to be easily added-on to a multi-surface, existing strap like watch band, belt, purse strap, or other strap and no changes to watch or watch band, or strap are required. It is portable, easy to make and its parts are not expensive.

BRIEF SUMMARY OF THE INVENTION

The object of the invention is to provide means of inexpensive, easily accessible, portable magnification. The present invention comprises a retractable magnifying glass device to be slid on a watch band, bracelet, belt, purse strap or any other strap. The device has a loop connected to the larger surface of its housing, made from rubber, plastic, velcro or similar material that can be slid on, attached to the watch band. One can extend the magnifying glass from its mounting on the strap, and after use either place it back, or have it automatically retract into resting position inside the housing.

BRIEF DESCRIPTION OF THE DRAWINGS

FIG. 3: is a perspective view of the embodiment shown in FIG. 2; and

FIG. 4: is a perspective view of another embodiment of the present invention wherein the retractable magnifying glass and the housing each have a magnet on their side allowing the magnifying glass to be magnetically connected to the housing.

Figure 1:
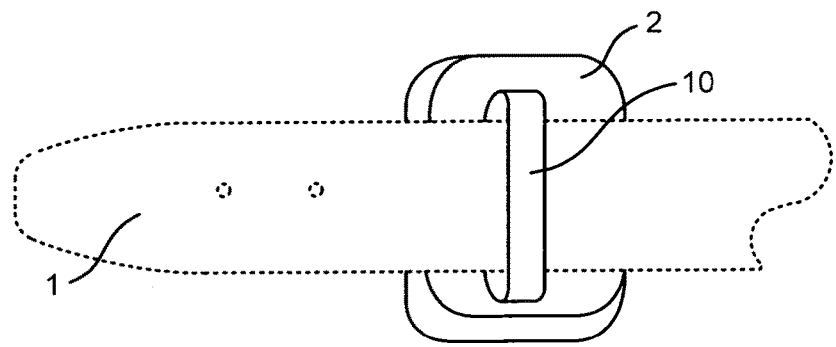
FIG. 1: is one embodiment showing the device affixed to a band.

REFERENCE NUMERALS IN THE DRAWINGS 1 strap (not part of the invention)
2 housing
3 magnifying glass
4 retractable spring
5 cord
6 bead
7 magnet
8 metal extension
9 retractable spring housing
10 strap connector
21 housing compartment for a spring
22 hosing compartment for a lens

DETAILED DESCRIPTION OF THE INVENTION

The magnifying glass has two positions: pulled out position and resting position. The magnifying glass comprises two parallel to each other large surfaces and two sets of parallel to each other narrow sides. The exterior of housing comprises two parallel to each other large surfaces and two sets of parallel to each other narrow sides.

FIG. 1 show the strap 1 with retractable magnifying glass 3 and the spring in a housing 2. The spring and separate compartment for the spring are not depicted. One of the large surfaces of the housing 2 is attached to the strap 1 with a strap connector 10. The other large surface of the housing has a notch to enable pulling out of the magnifying glass from the housing. The magnifying glass is inside the housing in its resting position.

Figure 2:
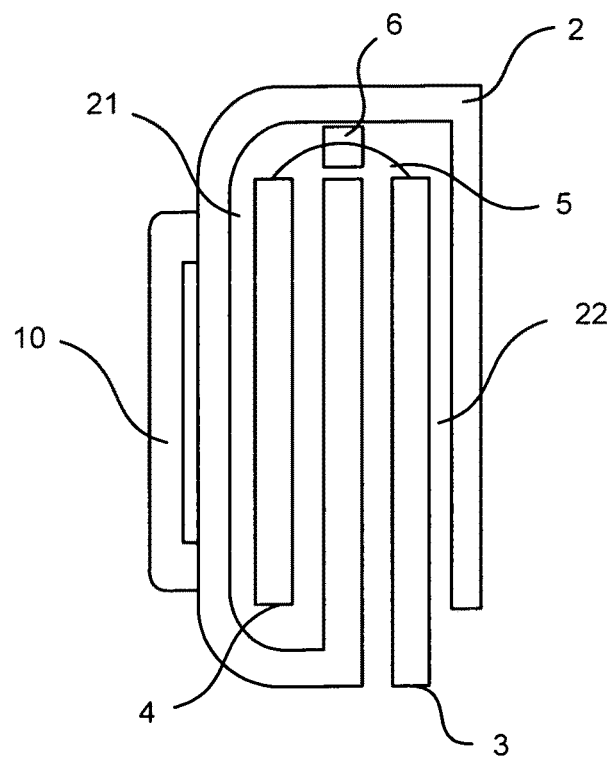
FIG. 2: is a cross-sectional view of one embodiment of the present invention.

FIG. 2 is a cross section showing the housing 2 with a divider inside the housing to hold the retractable spring 4 where the compartment 21 contains the spring 4 and compartment 22 contains a magnifying glass 3 in its resting position. The magnifying glass is connected by a cord going through a bead to a retractable spring. The bead attached to the far end of the housing redirects the cord which passes through its hole, to allow the magnifying glass to be in its resting position inside the housing parallel to the large surface of the spring compartment and parallel to the strap connector.

FIG. 3 shows the magnifying glass 3 pulled out from the separate compartment (not depicted) of the housing 2. The magnifying glass is connected to spring 4 by a cord 5 through a bead 6 to the farther end of the spring 4 allowing for automatic retraction of the magnifying glass 3 into the housing. In its resting position the magnifying glass 3 will be adjacent to the large surface of the housing compartment containing the spring 4. In this embodiment the edge of the magnifying glass closest to the housing in a pulled out position will end up next to the farther edge of the housing in the resting position.

FIG. 4 shows a different embodiment of the invention in the resting position with the retractable spring 4 and a magnifying glass 3 mounted side by side with the narrow edge of the magnifying glass parallel to the narrow edge of the spring housing. The spring housing 9 is attached with the strap connector (not depicted) to the strap. The spring 4 is connected with a cord 5 to the magnifying glass 3. The magnifying glass 3 is connected with a magnet 7 to the spring housing metal extension 8.

REFERENCES CITED

US PATENT DOCUMENTS

| Cited Patent | Filing date | Publication date | Applicant | Title |
| --- | --- | --- | --- | --- |
| U.S. Pat. No. 7,667,903 B2 | Feb. 13, 2009 | Feb. 23, 2010 | Mary Kisko | Retractably mounted magnifying glass assembly |
| U.S. Pat. No. 5,113,289 | Jan. 4, 1991 | May 12, 1992 | Sara Soper | Shelf-mounted magnifying glass |
| U.S. Pat. No. 6,441,974 B1 | Dec. 1, 2000 | Aug. 27, 2002 | Thomas A. Miranda, Jonathan C. Roche, Randolph G. Duso | Shopping cart magnifier (E-Z reader) |
| U.S. Pat. No. 2,679,785 A | Mar. 4, 1949 | Jun. 1, 1954 | Hugo Batt | Wrist watch |
| U.S. Pat. No. 8,125,853 B2 | Feb. 21, 2008 | Feb. 28, 2012 | Robert Greubel, Stephen Forsey | Watch bracelet |
| U.S. Pat. No. 5,601,222 A | May 25, 1995 | Feb. 11, 1997 | Richard Y. Haddad | Magnifying wristband |

Having described my invention I claim:

1. A retractable magnifying glass comprising:
   a magnifying glass having an aperture on one end;
   a housing having a front side and a back side, said back side having a strap connector for affixing to a strap, said housing having a first compartment and a second compartment, said first and second compartments being adjacent and parallel to each other and connected via a cord aperture, wherein said second compartment having an open side to allow ingress and egress of said magnifying glass and wherein a portion of said magnifying glass extends beyond said open side of said second compartment;
   a spring positioned parallel to said magnifying glass and within said first compartment; and
   a retractable cord affixed within said first compartment, said retractable cord having a first end and a second end, said first end connected to said spring and extending through said cord aperture and said second end connected to said aperture of said magnifying glass, wherein said second end connected to said magnifying glass when extended from said housing and released by a user will return said magnifying glass into said second compartment.

2. A retractable magnifying glass according to claim 1, further comprising a first magnet and a second magnet, wherein said first magnet is on said housing and said second magnet is on said magnifying glass such that said magnifying glass may be magnetically connected to said housing.

* * * * *